(12) United States Patent
Mustafa et al.

(10) Patent No.: US 12,440,231 B2
(45) Date of Patent: Oct. 14, 2025

(54) RETRIEVAL SYSTEM AND METHOD

(71) Applicant: CERETRIEVE LTD., Misgav Business Park (IL)

(72) Inventors: Maysa Mustafa, Zichron Yaakuv (IL); Maxim Vasylevytsky, Kefar-Sava (IL); Amir Belson, Savion (IL); Aviram Alfia, Karmiel (IL)

(73) Assignee: CERETRIEVE LTD., Misgav Business Park (IL)

( * ) Notice: Subject to any disclaimer, the term of this patent is extended or adjusted under 35 U.S.C. 154(b) by 266 days.

(21) Appl. No.: 18/204,133

(22) Filed: May 31, 2023

(65) Prior Publication Data

US 2023/0346402 A1    Nov. 2, 2023

Related U.S. Application Data

(63) Continuation of application No. PCT/IL2021/051461, filed on Dec. 8, 2021.
(Continued)

(51) Int. Cl.
*A61B 17/221*    (2006.01)
*A61B 17/22*    (2006.01)

(52) U.S. Cl.
CPC .. *A61B 17/221* (2013.01); *A61B 2017/22074* (2013.01); *A61B 2017/22079* (2013.01); *A61B 2017/2215* (2013.01)

(58) Field of Classification Search
CPC .......... A61B 17/12022; A61B 17/1204; A61B 17/12109; A61B 17/2131; A61B 17/12172; A61B 17/12136; A61B 17/22031; A61B 17/22032; A61B 17/221; A61B 17/02; A61B 17/0206; A61B 17/0218; A61B 17/0231; A61B 17/0281; A61B 17/0293; A61B 2017/0057; A61B 2017/2212; A61B 2017/2215; A61B 2017/2217; A61B 2017/22051; A61B 2017/0212; A61B 2017/0225; A61B 2017/0237; A61B 2017/0243; A61B 2017/0256;
(Continued)

(56) References Cited

U.S. PATENT DOCUMENTS 4,611,594 A    9/1986    Grayhack et al.
5,275,605 A    1/1994    Winkler
(Continued)

FOREIGN PATENT DOCUMENTS

CN    107205751 A    9/2017
EP    2288311 A2    3/2011
(Continued)

OTHER PUBLICATIONS

PCT International Search Report for International Application No. PCT/IL2021/051461, mailed Mar. 24, 2022, 3pp.
(Continued)

*Primary Examiner* — Kankindi Rwego
(74) *Attorney, Agent, or Firm* — The Roy Gross Law Firm, LLC; Roy D. Gross

(57) ABSTRACT

A catheter system including an inner tube movable within an outer tube and a funnel-shaped sleeve attached to the inner tube and configured for transitioning between a collapsed state when sequestered within the outer tube and an expanded state when advanced out of the outer tube.

19 Claims, 17 Drawing Sheets

Related U.S. Application Data

(60) Provisional application No. 63/122,992, filed on Dec. 9, 2020.

(58) Field of Classification Search
CPC .... A61B 2017/0262; A61B 2017/0268; A61B 2017/0275; A61B 2017/0287; A61B 2017/22034; A61B 2017/22035; A61B 2017/22079; A61L 31/022; A61L 31/10
USPC ....... 606/108, 127, 159, 191, 192, 194, 200; 604/19, 48, 96.01, 97.01
See application file for complete search history.

(56) References Cited

U.S. PATENT DOCUMENTS

| | | |
|---|---|---|
| 5,653,684 A | 8/1997 | Laptewicz et al. |
| 6,695,858 B1 | 2/2004 | Dubrul et al. |
| 6,893,451 B2 | 5/2005 | Cano et al. |
| 7,727,243 B2 | 6/2010 | Sepetka et al. |
| 8,585,713 B2 | 11/2013 | Ferrera et al. |
| 8,795,305 B2 | 8/2014 | Martin et al. |
| 8,900,179 B2 | 12/2014 | Jenson et al. |
| 9,155,552 B2 | 10/2015 | Ulm, III |
| 9,427,244 B2 | 8/2016 | Lund-Clausen et al. |
| 10,130,379 B2 | 11/2018 | Welch et al. |
| 10,179,224 B2 | 1/2019 | Yang et al. |
| 10,682,152 B2 | 6/2020 | Vale et al. |
| 10,792,056 B2 | 10/2020 | Vale et al. |
| 11,013,523 B2 | 5/2021 | Arad Hadar |
| 11,241,244 B2 | 2/2022 | Jaffe et al. |
| 11,344,325 B2 | 5/2022 | Harari et al. |
| 11,446,045 B2 | 9/2022 | Vale et al. |
| 11,534,191 B2 | 12/2022 | Ros Fàbrega et al. |
| 11,766,539 B2 | 9/2023 | Yee et al. |
| 2001/0051810 A1 | 12/2001 | Dubrul et al. |
| 2002/0072764 A1 | 6/2002 | Sepetka et al. |
| 2002/0161393 A1 | 10/2002 | Demond et al. |
| 2003/0078519 A1 | 4/2003 | Salahieh et al. |
| 2003/0176884 A1 | 9/2003 | Berrada et al. |
| 2003/0195537 A1 | 10/2003 | Dubrul et al. |
| 2004/0122468 A1 | 6/2004 | Yodfat et al. |
| 2005/0085826 A1 | 4/2005 | Nair et al. |
| 2005/0228417 A1 | 10/2005 | Teitelbaum et al. |
| 2006/0030865 A1 | 2/2006 | Balg |
| 2006/0047286 A1 | 3/2006 | West |
| 2006/0116659 A1 | 6/2006 | Wahr et al. |
| 2006/0155305 A1 | 7/2006 | Freudenthal et al. |
| 2006/0195118 A1 | 8/2006 | Richardson et al. |
| 2006/0195137 A1 | 8/2006 | Sepetka et al. |
| 2009/0192485 A1 | 7/2009 | Heuser |
| 2010/0030256 A1 | 2/2010 | Dubrul et al. |
| 2012/0041419 A1 | 2/2012 | Blanchard et al. |
| 2012/0041449 A1 | 2/2012 | Eckhouse et al. |
| 2012/0041474 A1 | 2/2012 | Eckhouse et al. |
| 2012/0277788 A1 | 11/2012 | Cattaneo |
| 2013/0079796 A1 | 3/2013 | Slee et al. |
| 2014/0171958 A1 | 6/2014 | Baig |
| 2014/0257362 A1 | 9/2014 | Eidenschink |
| 2014/0309655 A1 | 10/2014 | Gal et al. |
| 2016/0310255 A1 | 10/2016 | Purcell et al. |
| 2017/0215900 A1 | 8/2017 | Lowinger et al. |
| 2018/0193026 A1 | 7/2018 | Yang et al. |
| 2018/0235743 A1* | 8/2018 | Farago .................. A61B 17/22 |
| 2019/0274810 A1 | 9/2019 | Phouasalit et al. |
| 2019/0298396 A1 | 10/2019 | Gamba et al. |
| 2020/0009301 A1 | 1/2020 | Yee |
| 2020/0138460 A1 | 5/2020 | Yang et al. |
| 2020/0297972 A1 | 9/2020 | Yee et al. |
| 2021/0059695 A1 | 3/2021 | Harari et al. |
| 2021/0077134 A1 | 3/2021 | Vale et al. |
| 2021/0106238 A1 | 4/2021 | Strasser et al. |
| 2021/0154433 A1 | 5/2021 | Casey et al. |
| 2021/0177427 A1 | 6/2021 | Nguyen et al. |
| 2021/0186537 A1 | 6/2021 | Buck et al. |
| 2021/0186542 A1 | 6/2021 | Buck et al. |
| 2021/0187244 A1 | 6/2021 | Buck et al. |
| 2021/0315596 A1 | 10/2021 | Buck et al. |
| 2021/0315597 A1 | 10/2021 | Buck et al. |
| 2021/0315598 A1 | 10/2021 | Buck et al. |
| 2021/0316121 A1 | 10/2021 | Buck et al. |
| 2021/0316127 A1 | 10/2021 | Buck et al. |
| 2022/0047849 A1 | 2/2022 | Yee et al. |
| 2022/0117614 A1 | 4/2022 | Salmon et al. |
| 2022/0330960 A1 | 10/2022 | Buck et al. |
| 2022/0331085 A1 | 10/2022 | Buck et al. |
| 2022/0331509 A1 | 10/2022 | Buck et al. |
| 2022/0354517 A1 | 11/2022 | Behan |
| 2023/0015259 A1 | 1/2023 | Buck et al. |
| 2023/0048055 A1 | 2/2023 | Lau |
| 2023/0061728 A1 | 3/2023 | Davis et al. |
| 2023/0072403 A1 | 3/2023 | Strasser et al. |
| 2023/0127145 A1 | 4/2023 | Arad Hadar et al. |
| 2023/0211122 A1 | 7/2023 | Luna et al. |
| 2024/0032949 A1 | 2/2024 | Yang et al. |
| 2024/0033016 A1 | 2/2024 | Yang et al. |
| 2024/0033018 A1 | 2/2024 | Yang et al. |
| 2024/0033019 A1 | 2/2024 | Lau et al. |
| 2024/0033486 A1 | 2/2024 | Lau et al. |
| 2024/0042124 A1 | 2/2024 | Bartholomew |
| 2024/0042142 A1 | 2/2024 | Bartholomew et al. |

FOREIGN PATENT DOCUMENTS

| | | |
|---|---|---|
| EP | 2578184 A1 | 4/2013 |
| EP | 3335647 A2 | 6/2018 |
| EP | 3990083 A1 | 5/2022 |
| ES | 2577288 A1 | 7/2016 |
| JP | 7017408 B2 | 2/2022 |
| WO | 2001008742 A1 | 2/2001 |
| WO | 2001008743 A1 | 2/2001 |
| WO | 2002011627 A2 | 2/2002 |
| WO | 2002056797 A2 | 7/2002 |
| WO | 2002094111 A2 | 11/2002 |
| WO | 2003009781 A1 | 2/2003 |
| WO | 2003032868 A1 | 4/2003 |
| WO | 2009076482 A1 | 6/2009 |
| WO | 2010017537 A2 | 2/2010 |
| WO | 2016010995 A1 | 1/2016 |
| WO | 2016113047 A1 | 7/2016 |
| WO | 2016/126974 A1 | 8/2016 |
| WO | 2017072663 A1 | 5/2017 |
| WO | 2017072761 A1 | 5/2017 |
| WO | 2017097616 A1 | 6/2017 |
| WO | 2017/147493 A1 | 8/2017 |
| WO | 2019064306 A1 | 4/2019 |
| WO | 2019212984 A1 | 11/2019 |
| WO | 2019213179 A1 | 11/2019 |
| WO | 2020/010310 A1 | 1/2020 |
| WO | 2020079082 A1 | 4/2020 |
| WO | 2020099386 A1 | 5/2020 |
| WO | 2020/144071 A1 | 7/2020 |
| WO | 2020/260632 A1 | 12/2020 |
| WO | 2021016213 A1 | 1/2021 |
| WO | 2021067264 A1 | 4/2021 |
| WO | 2021067642 A1 | 4/2021 |
| WO | 2021127004 A1 | 6/2021 |
| WO | 2021183444 A1 | 9/2021 |
| WO | 2021263033 A1 | 12/2021 |
| WO | 2022028831 A1 | 2/2022 |
| WO | 2022028833 A1 | 2/2022 |
| WO | 2022035867 A1 | 2/2022 |
| WO | 2022055810 A1 | 3/2022 |
| WO | 2022123565 A1 | 6/2022 |
| WO | 2022180083 A1 | 9/2022 |
| WO | 2022180084 A1 | 9/2022 |
| WO | 2023019118 A1 | 2/2023 |
| WO | 2023019122 A1 | 2/2023 |
| WO | 2023034375 A1 | 3/2023 |
| WO | 2023044231 A1 | 3/2023 |
| WO | 2023069874 A1 | 4/2023 |
| WO | 2023091762 A1 | 5/2023 |
| WO | 2023117159 A1 | 6/2023 |
| WO | 2023117919 A1 | 6/2023 |
| WO | 2023159063 A2 | 8/2023 |

(56) References Cited

FOREIGN PATENT DOCUMENTS

| WO | 2023220707 | A2 | 11/2023 |
| WO | 2023248224 | A1 | 12/2023 |
| WO | 2024020506 | A2 | 1/2024 |
| WO | 2024030368 | A2 | 2/2024 |
| WO | 2024030405 | A2 | 2/2024 |

OTHER PUBLICATIONS

PCT Written Opinion for International Application No. PCT/IL2021/051461, mailed Mar. 24, 2022, 9pp.
PCT International Preliminary Report on Patentability for International Application No. PCT/IL2021/051461, issued Jun. 13, 2023, 10pp.
PCT International Search Report for International Application No. PCT/IL2023/050643, mailed Sep. 11, 2023, 3pp.
PCT Written Opinion for International Application No. PCT/IL2023/050643, mailed Sep. 11, 2023, 5pp.
PCT International Search Report for International Application No. PCT/IL2018/051074, mailed Jan. 13, 2019, 3pp.
PCT Written Opinion for International Application No. PCT/IL2018/051074, mailed Jan. 13, 2019, 7pp.
United States Patent and Trademark Office, Non-Final Office Action for U.S. Appl. No. 18/615,413, mailed Oct. 31, 2024, 17pp.
United States Patent and Trademark Office, Non-Final Office Action for U.S. Appl. No. 17/731,423, mailed Sep. 7, 2023, 17pp.
United States Patent and Trademark Office, Non-Final Office Action for U.S. Appl. No. 16/644,244, mailed Jun. 23, 2021, 21pp.

\* cited by examiner

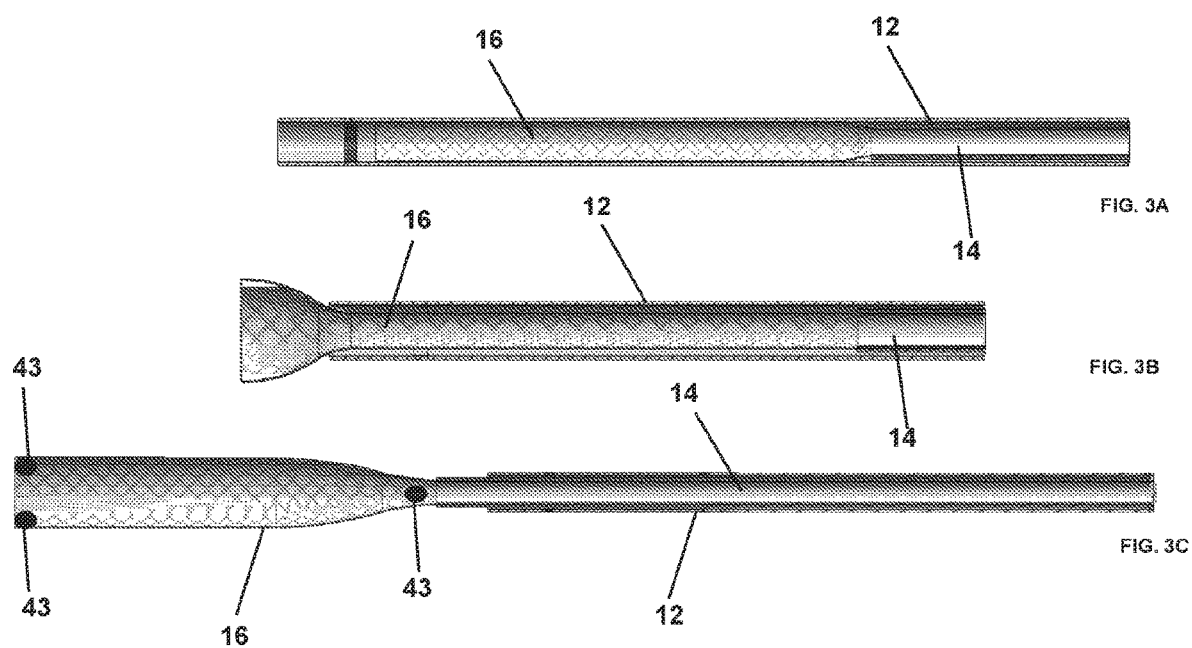

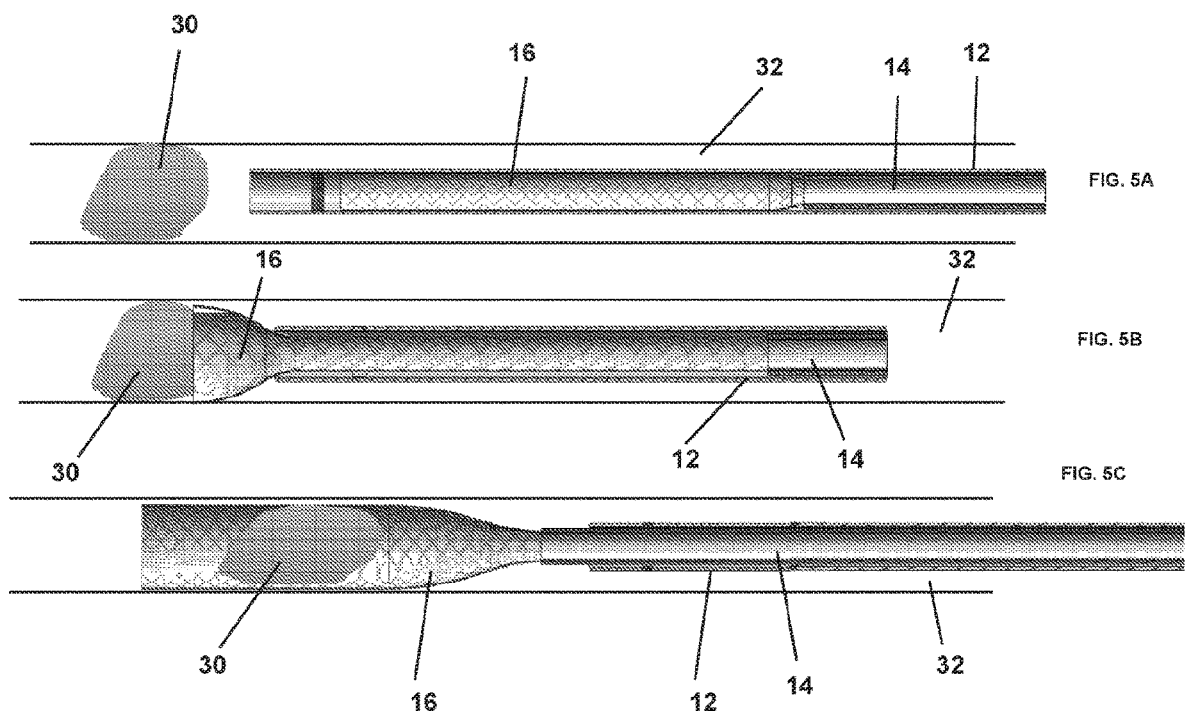

RETRIEVAL SYSTEM AND METHOD

CROSS REFERENCE TO RELATED APPLICATIONS

This application is a Bypass Continuation of PCT Patent Application No. PCT/IL2021/051461 having International filing date of Dec. 8, 2021, which claims the benefit of priority of U.S. Provisional Patent Application No. 63/122,992, filed Dec. 9, 2020, the contents of which are all incorporated herein by reference in their entirety.

BACKGROUND

The present invention relates to a system for retrieving material or objects from a biological vessel and to a method of using same. Embodiments of the present invention relate to a catheter having a funnel-like trap that is highly effective in trapping and retrieving brain emboli/thrombi.

Interventional procedures that are used to treat vascular pathologies not easily accessed by surgical procedures continue to increase in volume in recent years.

Such interventional procedures are particularly advantageous when used to treat pathologies that are located in small and remote vessels such as those within the brain.

Brain embolism is a vascular pathology that is caused when material, typically a blood clot, migrates and blocks a blood vessel that supplies brain tissue.

One conventional technique for retrieving a brain embolus involves the use of a retrieval catheter having a funnel-like trap that is used to capture and retrieve the embolus.

Although such retrieval devices are effective in retrieving small clots, retrieval of large clots can lead to clot fragmentation and release of potentially harmful clot particles into the blood stream.

Thus, there is still room for improvement in clot retrieval systems and in particular in the clot engagement and retraction capabilities of such systems.

SUMMARY

According to one aspect of the present invention there is provided a catheter system for retrieving material from a biological vessel comprising: an inner tube movable within an outer tube; a funnel-shaped sleeve attached to the inner tube and being configured for transitioning between a collapsed state when sequestered within the outer tube and an expanded state when advanced out of the outer tube; and a mechanism or indicator for enabling a user to advance a portion of the sleeve of a predetermined length out of the outer tube.

According to embodiments of the present invention the mechanism is a trigger for triggering advancement of the portion.

According to embodiments of the present invention the indicator includes marking for indicating advancement of the portion.

According to embodiments of the present invention the sleeve is a braided sleeve.

According to embodiments of the present invention the braided sleeve decreases in length when expanded.

According to embodiments of the present invention the braided sleeve includes a cover.

According to embodiments of the present invention the cover is fabricated from polyurethane, TPU, PTFE or Silicone.

According to embodiments of the present invention the catheter system further comprises a conduit for applying suction within the braided sleeve.

According to embodiments of the present invention the catheter system further comprises a vacuum source in communication with the conduit.

According to embodiments of the present invention the portion of the sleeve of the predetermined length forms a cone when advanced out of the outer tube.

According to embodiments of the present invention a distal opening of the sleeve includes a closure mechanism.

According to embodiments of the present invention the closure mechanism includes a pull wire.

According to embodiments of the present invention the pull wire cinches closed the distal opening.

According to embodiments of the present invention the pull wire is arranged so as to enable separation of the material from a wall of the funnel-shaped sleeve includes.

According to embodiments of the present invention a distal end of the sleeve is beveled such that an opening of the sleeve forms a tilted oval when expanded.

According to embodiments of the present invention the funnel-shaped sleeve includes a radiopaque marker band.

According to embodiments of the present invention the braided sleeve includes wire loops at a distal end.

According to embodiments of the present invention the cover includes a hydrophobic coating.

According to embodiments of the present invention the catheter system further comprises a conduit for injecting a dye.

According to embodiments of the present invention the catheter system further comprises at least one sensor for identifying presence of the material within the funnel-shaped sleeve.

According to embodiments of the present invention a first sensor of the at least one sensor is positioned at a proximal region of the funnel-shaped sleeve.

According to embodiments of the present invention a second sensor of the at least one sensor is positioned at a distal region of the funnel-shaped sleeve.

According to embodiments of the present invention the catheter system further comprises a plurality of flexible arms positioned within the funnel-like sleeve and being attached thereto.

According to embodiments of the present invention the funnel-like sleeve has an hourglass-like shape when fully deployed.

According to another aspect of the present invention there is provided a method of retrieving material from a biological vessel comprising: partially advancing a funnel-shaped sleeve out of a tube of a catheter positioned in the biological vessel so as to form a cone of a predetermined length within the biological vessel; suctioning the material in the biological vessel into the cone; and further advancing the funnel-shaped sleeve out of the tube and applying the suction to thereby trap the material within the funnel-shaped sleeve.

According to embodiments of the present invention suctioning is effected while advancing the catheter in a direction of the material.

According to embodiments of the present invention the method further comprises closing a distal end of the funnel-shaped sleeve.

According to embodiments of the present invention the catheter is advanced through the biological vessel following partial deployment.

According to another aspect of the present invention there is provided a catheter system for retrieving material from a biological vessel comprising: an inner tube movable within an outer tube; a funnel-shaped sleeve attached to the inner tube and being configured for transitioning between a collapsed state when sequestered within the outer tube and an expanded state when advanced out of the outer tube; and a plurality of flexible arms positioned within the funnel-like sleeve and being attached thereto, the plurality of flexible arms are configured capable of allowing material to enter the funnel-like sleeve while preventing the material from releasing out of the funnel-like sleeve.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. In case of conflict, the patent specification, including definitions, will control. In addition, the materials, methods, and examples are illustrative only and not intended to be limiting.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIGS. 3A-C illustrate a two stage deployment of the standard-funnel catheter configuration.

FIGS. 5A-C illustrate clot capture using the standard-funnel catheter configuration.

DETAILED DESCRIPTION

Figure 1A:
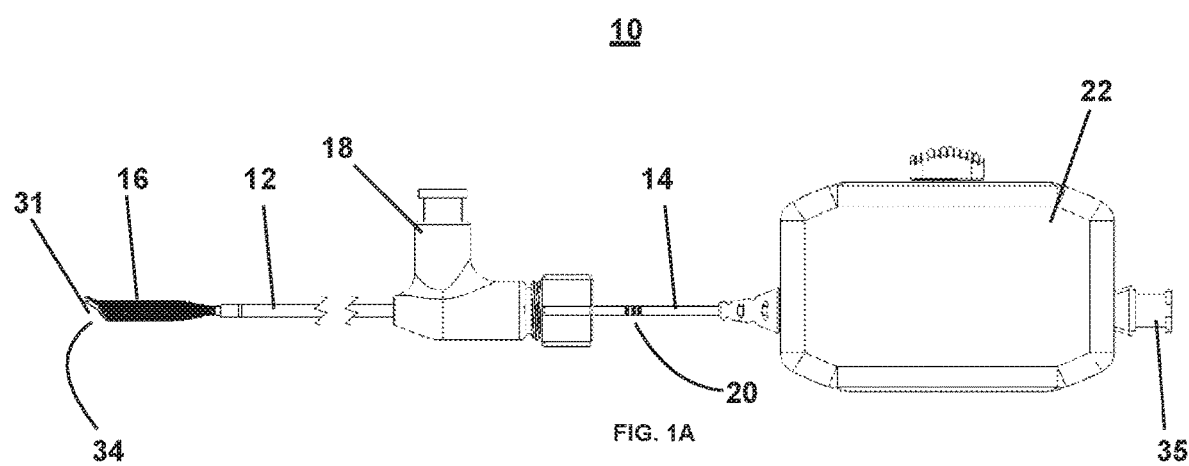
FIGS. 1A-1F and 1G illustrate embodiments of the present catheter system including shovel-like funnels (FIGS. 1A, 1D-1F and 1G), a standard funnel (FIG. 1B), a trigger-release handle (FIGS. 1A-B) and a handle with markings (FIG. 1C).

The present invention is of a catheter system and method that can be used to retrieve material/objects such as emboli from a biological vessel such as a blood vessel.

The principles and operation of the present invention may be better understood with reference to the drawings and accompanying descriptions.

Before explaining at least one embodiment of the invention in detail, it is to be understood that the invention is not limited in its application to the details set forth in the following description or exemplified by the Examples. The invention is capable of other embodiments or of being practiced or carried out in various ways. Also, it is to be understood that the phraseology and terminology employed herein is for the purpose of description and should not be regarded as limiting.

Mechanical thrombectomy devices that utilize traps for retrieving clot material are well known in the art. Such traps can include a closable distal opening for maintaining the retrieved clot within the sleeve while minimizing release of clot or fragments from the trap when it is pulled out of the vasculature.

In a previously-filed patent application (WO2019064306), the present inventors disclosed a unique trap-closure mechanism that substantially enhances whole clot retrieval. While reducing the present invention to practice, the present inventors set out to improve clot-trapping capabilities especially in cases of large clots.

Thus, according to one aspect of the present invention there is provided a catheter system for retrieval of material or object from a biological vessel.

As used herein, the term "material" refers to a biological material such as that characterizing a thrombus/embolus while the term "object" refers to an implant such as a stent, stent-graft and the like.

Any biological vessel can be accessed and treated using the present system, examples include vessels of the circulatory system (e.g., arteries, veins, lymph vessels), vessels of the urinary tract (e.g., urethra, ureters) and vessels of the lymphatic system.

The system of the present invention includes a funnel-like sleeve configured for transitioning between collapsed and expanded states. When in the expanded state the funnel-like sleeve is shaped as a funnel that tapers in diameter from the distal to the proximal end. The funnel includes a lumen that is accessible via a distal opening that can be circular in shape and perpendicular to the longitudinal axis of the catheter (also referred to herein as a "standard configuration") or oval in shape and tilted/angled with respect to the longitudinal axis of the catheter also referred to herein as a "shovel configuration").

When collapsed, the funnel-like sleeve is a narrow cylinder having a small lumen (large enough for threading of a guidewire and/or microcatheter). The funnel-like sleeve can be self-expanding in which case, at least a portion of which will self-expand to a final diameter that is limited by a diameter of the vessel (and up to a diameter limited by the braid structure and the extent of deployment from the catheter sheath).

According to one embodiments of the present invention, the funnel-like sleeve can be fabricated from metallic (e.g. stainless steel or NITINOL) or polymeric (e.g., PTFE) wires that are braided in alternating helical and counter-helical directions. The braid can be covered (completely or partially) with a polymer such as TPU or polyurethane to allow application of a vacuum to an internal volume of the funnel-like sleeve.

The diameter of the wire can be between 0.02-0.25 mm while the braid angle between wires can range between 60-140 degrees. The funnel-like sleeve can be fabricated using a mandrel of suitable size by wrapping wires in an alternating helical pattern. For example, a single wire can be looped and the tails of the loop can be wrapped in a helical pattern around the mandrel so as to form a crisscrossing pattern in every wire (1×1 pattern) or crisscrossing pattern every 2 wires (2×1 pattern) along the length of the mandrel. Several wires (12-64) can be used to form the braided structure. The structure of a braid with the same pattern with a small diameter (FIG. 1G) have advantages with some configurations since it increases funnel radial force and thus prevents collapse under suction. An example of such braiding is provided in WO2019064306. The funnel-like sleeve can include wire loops at a distal end thereof (surrounding the opening of an expanded funnel-like sleeve). The wire loops form leaflets that provide axial support and decrease braid compression when the funnel-like sleeve contacts the clot (thereby minimizing an accordion effect that can occur when a braided structure is pushed against a clot). The wire loops also form a soft tip that minimizes vessel trauma during deployment. During suction, these wire leaflets collapse around and envelope the clot without causing collapse of the braid structure.

The parameters and dimensions of the catheter and funnel-like sleeve depend on use and type of vessel. When used in ischemic stroke applications in an intra-cranial artery, the target artery size could vary between 2.5-4.5 mm. The funnel-like sleeve diameter should be at least slightly larger than the vessel diameter to arrest blood flow, and would therefore range between 2-7 mm. The length of the funnel-like sleeve can be long enough to support receiving long clots within the lumen, but short enough to allow deployment of the funnel-like sleeve by pushing it out of the catheter outer tube or by pulling in of a sheath.

The present system also includes a catheter for delivering the funnel-like sleeve into the vessel. According to one embodiment of the present invention, the funnel-like sleeve can be attached to a distal end of the catheter inner tube (shaft) and covered by a removable sheath (outer tube) when in the collapsed configuration. Removal (pulling in proximal direction) of the sheath can deploy the funnel-like sleeve.

In another embodiment of the present invention the funnel-like sleeve is trapped in a collapsed state in a lumen of the outer tube of the catheter and is pushed out for deployment via an inner tube that is attached to the proximal end of the funnel-like sleeve.

The present catheter system can also include a source of suction (e.g., syringe, pump) that can apply a suctioning force to the lumen (internal volume) of the funnel-like sleeve via a dedicated conduit that fluidly connects the source of suction to the lumen of the funnel-like sleeve. The inner tube of the catheter can double as the fluid conduit.

Experiments conducted by the present inventors revealed that the distal opening of a fully extended funnel-like sleeve can at times be blocked by large thrombi when suction is applied to the lumen of the funnel-like sleeve. Such blockage can lead to collapse of the funnel-like sleeve upon suction.

The present inventors have discovered that partial deployment of the funnel-like sleeve such that a cone 2-8 mm in length extends out of the catheter or is uncovered by the sheath substantially enhances the ability of the system to collect thrombus material without blockage or collapse. As such, the present inventors have devised an approach wherein a conical portion of the funnel-like sleeve is first deployed (at the thrombus or deployed and advanced to the thrombus) and the thrombus is engaged and suctioned into this portion and then the rest of the funnel-like sleeve is gradually deployed while maintaining suction to completely engulf and trap the thrombus.

With this approach, the present system aspirates the thrombus and increases the volume of the funnel as it engulfs the thrombus.

To enable such functionality, the catheter system includes a mechanism or an indicator to allow partial deployment of the funnel-like sleeve. The mechanism can include a trigger for precise deployment of a portion of the funnel-like sleeve or an indicator having markings that enable a user to deploy a portion of the funnel-like sleeve of a specific length.

Referring now to the drawings, FIGS. 1A-D illustrate the catheter system of the present invention which is referred to hereinunder as system 10.

Figure 1B:
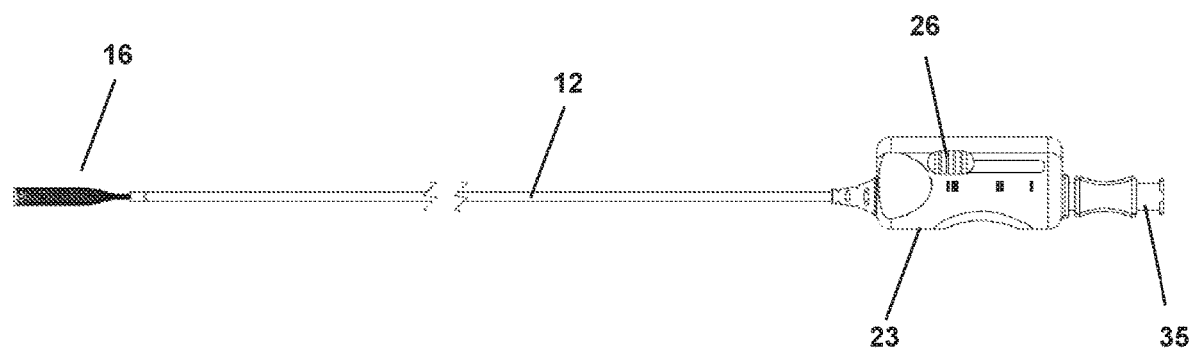
Figure 1C:
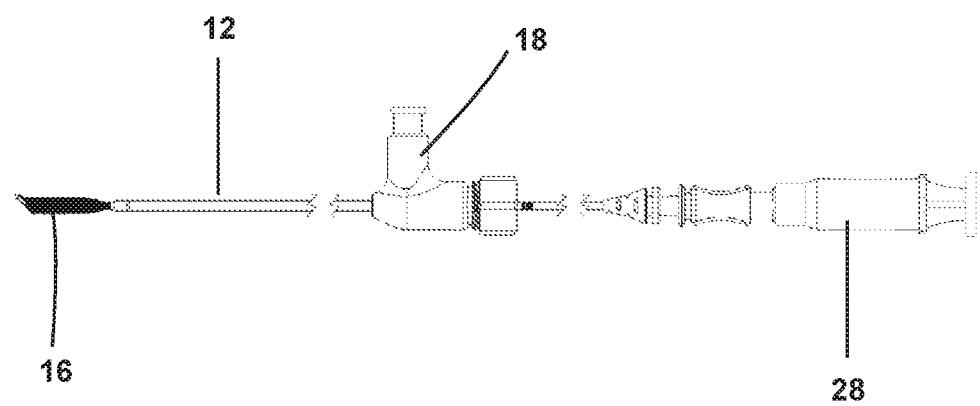

System 10 includes a catheter shaft that includes an outer tube 12 surrounding an inner tube 14. Inner tube 14 is attached to a funnel-like sleeve 16 (shown deployed in FIGS. 1A-C) that is used to trap (within lumen) and retrieve a material or object from a biological vessel (e.g., artery). Funnel-like sleeve 16 includes a distal opening 34 and a lumen 33 and can be one of two types, a shovel-like funnel-like sleeve 16 (FIGS. 1A, 1C, 1D) or a standard funnel-like sleeve 16 (FIG. 1B).

Inner tube 14 can be an elongated hollow tube selected of a length, diameter and flexibility suitable for the intended treatment location. Different anatomical locations will require Inner tube 14 of different stiffness and axial flexibility. Inner tube 14 having variable stiffness and axial flexibility along the shaft length is well known in the art and can be braided or coiled with an internal coating of a low friction material as PTFE, a metal braiding or coil over the internal layer, and an external polymer layer (jacket) such as PEBAX or polyamide composites with various durometer ratings. Such tubes are commonly used for delivery into tortuous vasculature or intra-cranial vasculature.

Outer tube 12 can be an elongated hollow tube capable of sliding over inner tube 14. The length of Inner tube 14 can be shorter than the length of inner tube 14 and to enable pulling back of outer tube 12 for partial and full deployment of funnel-like sleeve 16.

Outer tube 12 is selected of a length, diameter and flexibility suitable for the intended treatment location. Requiring high distal flexibility and trackability performances, achieved by selecting soft material jacket and metal coil design. Outer tube 12 can be of different stiffness and axial flexibility and proximal stiffness and pushability for delivery in tortuous anatomy. A tube having variable stiffness and axial flexibility along its length is well known in the art. Such a tube can be braided or coiled with an internal polymer layer having low friction layer (e.g., PTFE), a metal braiding and coil in different sections over the internal layer, and an external polymer layer (jacket) such as PEBAX, polyurethane or polyamide composites with various durometer ratings.

The outer diameter of inner tube 14 can be 0.5-4 mm (e.g., 1.5 mm), while the inner diameter of inner tube 14 (can function as the aspiration conduit) can be 0.3-3.5 mm. A wire lumen (for closure) can be separate from the inner lumen and can be 0.03-0.3 mm in diameter (can be positioned in the wall of inner tube 14). The length of inner tube 14 can range anywhere between 50-150 cm and is selected according to the target vessel and location treated.

The outer diameter of outer tube 12 can be 1-6 mm, while the inner diameter of outer tube 12 (accommodates inner tube 14) can be 0.8-5.5 mm. The length of outer tube 12 can range anywhere between 45-145 cm and is selected according to the target vessel and location treated.

Figure 1D:
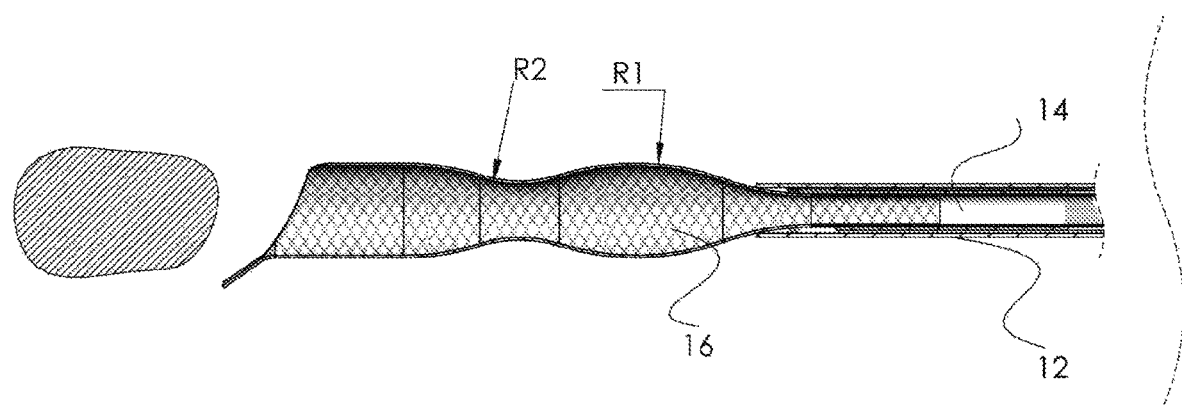
Figure 1E:
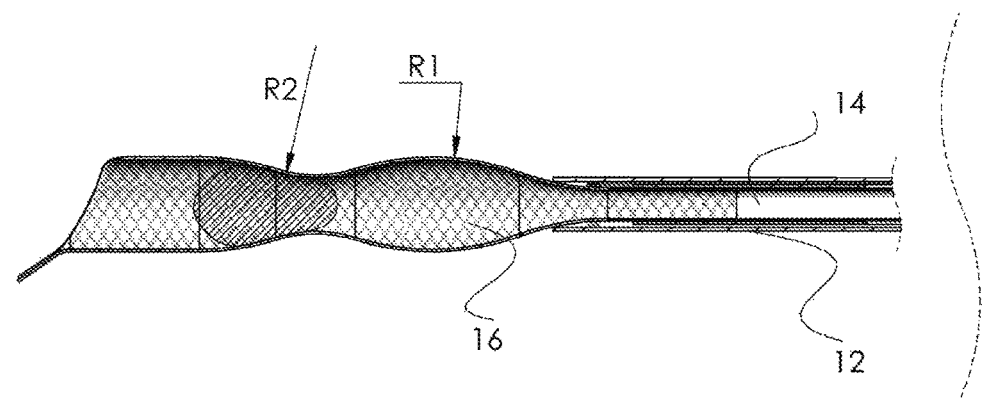
Figure 1F:
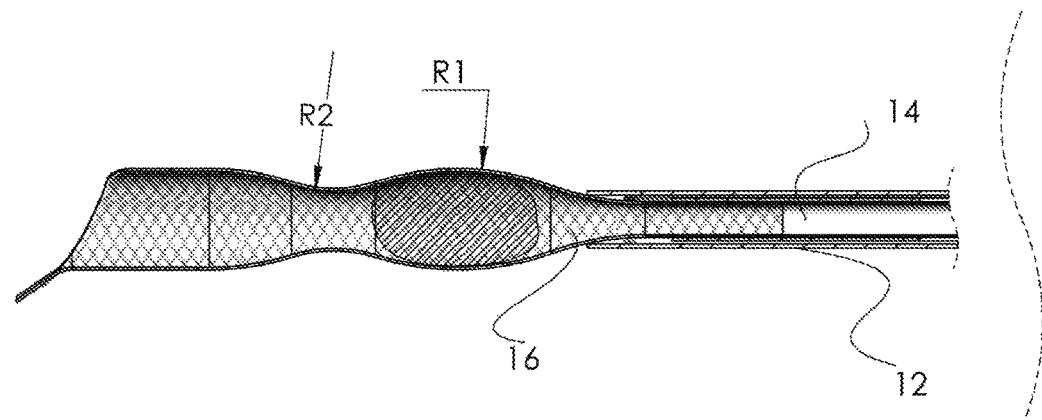
Figure 1G:
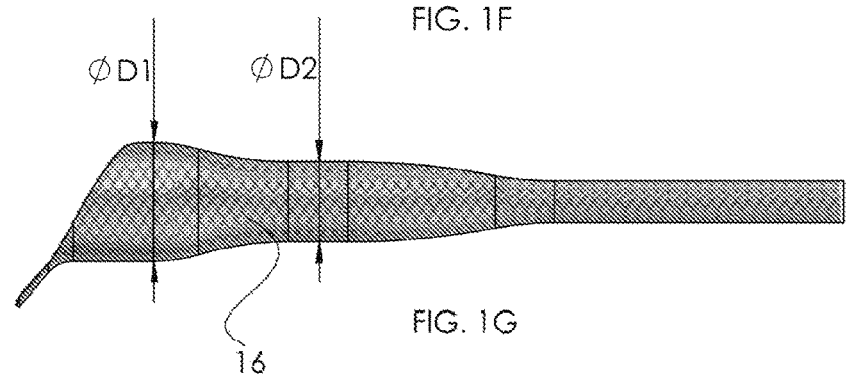

Funnel-like sleeve 16 can be 5-80 mm in length with a diameter tapering from 1-20 mm (distal) to 0.3-18 (Proximal) when fully deployed and 10-160 mm when sequestered within outer tube 12. Funnel-like sleeve 16 (standard or shovel) can alternatively have an hourglass shape when deployed (FIG. 1D). The hourglass shape is advantageous the differences in diameter at the two regions of funnel-like sleeve 16 (marked as R1 and R2, proximal, distal respectively) cause a pressure differential between the funnel sections (distal proximal) due to the Bernoulli Principle and thus aid in advancing the material toward the proximal region (R1) of the funnel. Another advantage is that the proximal region (R1) can trap and hold a thrombus and prevent its release due to its smaller diameter (FIG. 1F) (collapses onto the material).

The hourglass shape of funnel-like sleeve 16 shape (FIG. 1G) is advantageous in that a narrowing region (e.g., transition from R2 to R1) will have an increase in PPI (Pitch Per Inch), which increases funnel rigidity thus prevents collapse under suction.

Deployment of funnel-like sleeve 16 can be effected by pulling back (proximally) outer tube 12 using handle 18 that is attached to outer tube 12 (FIG. 1A) or by pushing out (distally) inner tube 14 against handle 18. Markings 20 can be used to determine the length of funnel-like sleeve 16 that is deployed. Such markings can be used for partial deployment of funnel-like sleeve 16 to form a cone-like shape (FIGS. 2B, 3B) of a predetermined length.

Figure 6A:
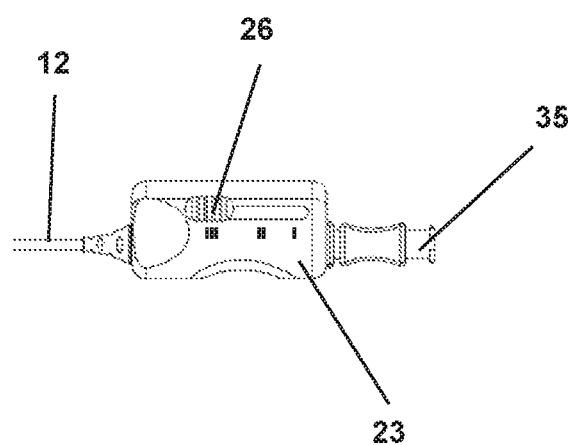
FIGS. 6A-B illustrate the trigger handle (FIG. 6A) and markings (FIG. 6B) used for partial deployment of a shovel or standard funnel.
Figure 6B:
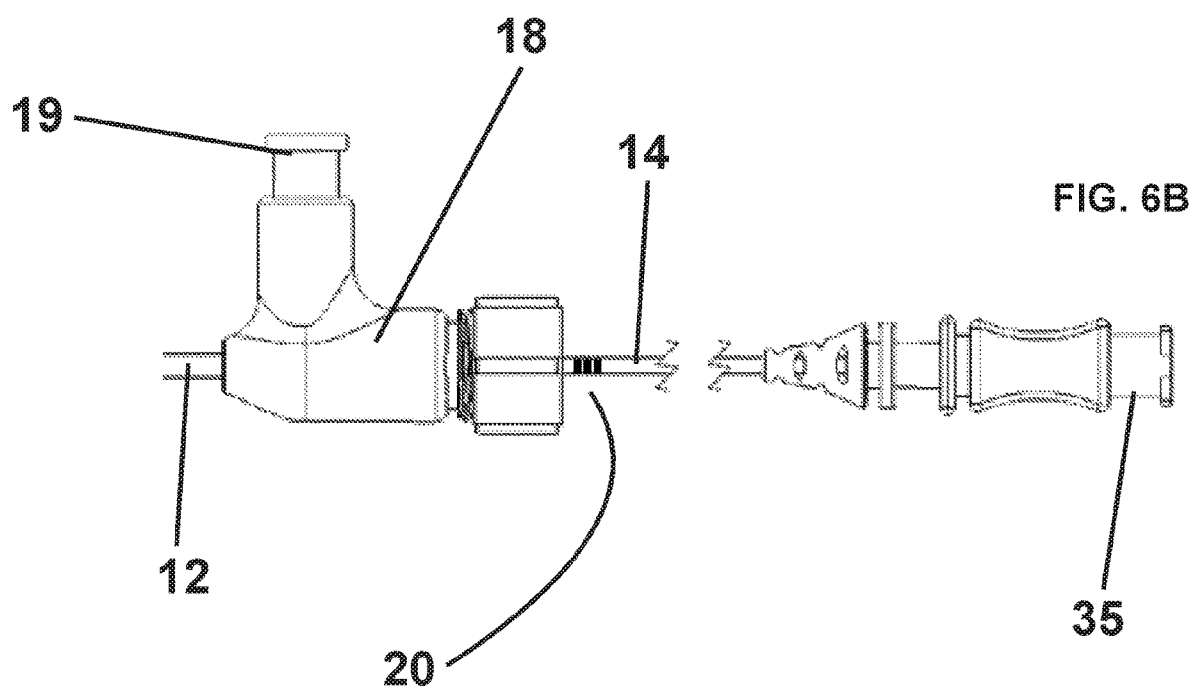

FIG. 6B illustrates in greater detail a handle 18 that can be moved along with outer tube 12 to partially deploy and then fully deploy funnel-like sleeve 16. Handle 18 include a button 19 for releasing/locking movement of outer tube 12 with respect to inner tube 14. Markings 20 on inner tube 14 indicate partial (one or more stages) and full deployment of funnel-like sleeve 16.

System 10 can also include an actuator 22 for closing funnel-like sleeve 16 following entrapment of, for example, a thrombus. Such an actuator can include a mechanism for pulling a wire spanning from actuator 22 through inner tube 14 and to a distal opening 34 of funnel-like sleeve 16. Such a wire, when pulled, can cinch closed funnel-like sleeve 16.

The pull wire extends from the proximal end through the inner catheter (e.g., side wall conduit) through the lumen of funnel-like sleeve (in a helical pattern) and attaches to some or all of the wire loops forming distal end 31.

Closure can be via cinching (e.g., purse string) or via deflection (in the shovel configuration) by pulling the extended portions of the distal end (shovel tip) towards the base of the shovel. Alternatively, the shovel tip can be angled downward 10-30 degrees to disconnect the thrombus from the vessel wall by pulling the closure wire and lifting it thereby changing the height of the shovel.

Figure 2A:
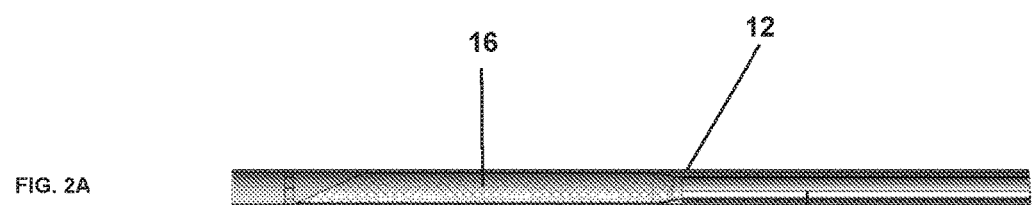
FIGS. 2A-C illustrate a two stage deployment of the shovel-funnel catheter configuration.
Figure 2B:
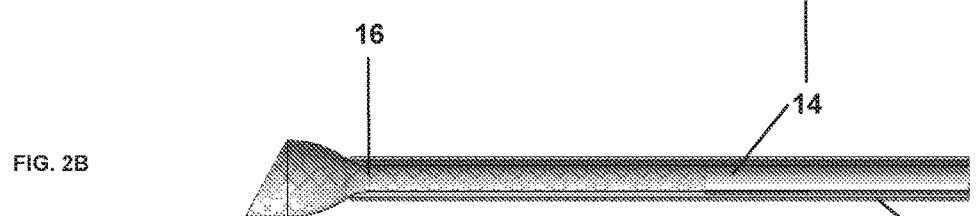
Figure 2C:
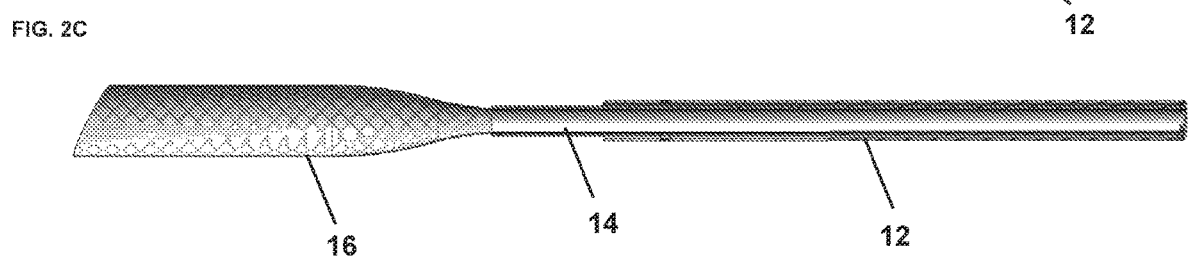

FIG. 1B illustrates a handle 23 that includes a trigger 26 and mechanism for triggering partial deployment of funnel-like sleeve 16 (to the state shown in FIGS. 2B, 3B). The mechanism pulls back outer tube 12 a measured distance upon actuation of trigger 26. Alternatively, trigger 26 can be a slider that is movable to an indent or marking. A slider configuration of handle 23 is shown in greater detail in FIG. 6A showing. Trigger 26 is a slider button that can be moved proximally-distally along housing 27. Such movement pulls outer tube 12 proximally to partially and then fully uncover and deploy funnel-like sleeve 16. Indents in housing 27 stop the slider button at preset positions corresponding to a first partial deployment (cone-like shape), second and optionally third partial deployments and full deployment.

System 10 can also include a source of suction attached to inner tube 14 through port 35. Such a source of suction can be a syringe 28 (FIG. 1C) or a pump that applies a suctioning pressure of −2 to −12 psi.

FIGS. 2A-C and 3A-C illustrate deployment of a shovel-like (FIGS. 2A-C) or standard (FIGS. 3A-C) funnel-like sleeve 16 out of outer tube 12. As is mentioned hereinabove, funnel-like sleeve 16 is deployed in steps wherein in a first step it is partially deployed to form a cone-like shape. Such deployment can be effected by pulling in outer tube 12 or pushing out inner tube 14 as is describe hereinabove.

In the shovel configuration, partial deployment (e.g., of a tip portion) can be used to facilitate navigation through torturous vessels.

Figure 2D:
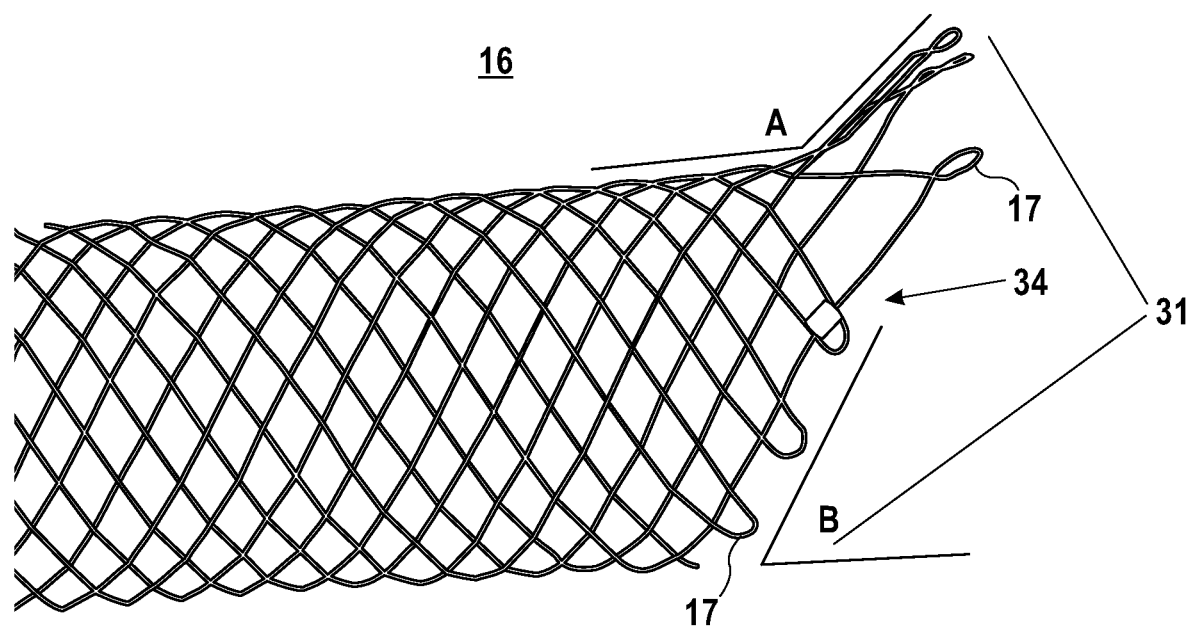
FIGS. 2D-F illustrate a shovel configuration in greater detail showing the leaflets formed from wire loops.
Figure 2E:
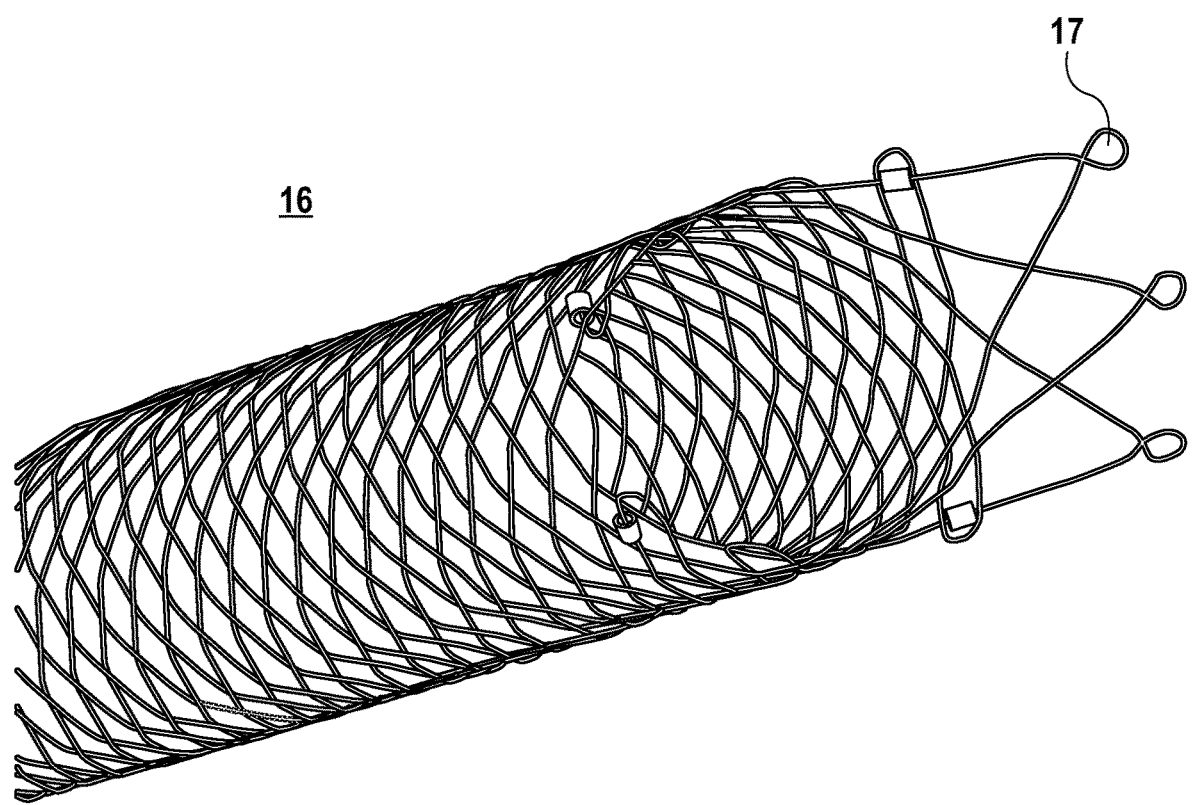
Figure 2:
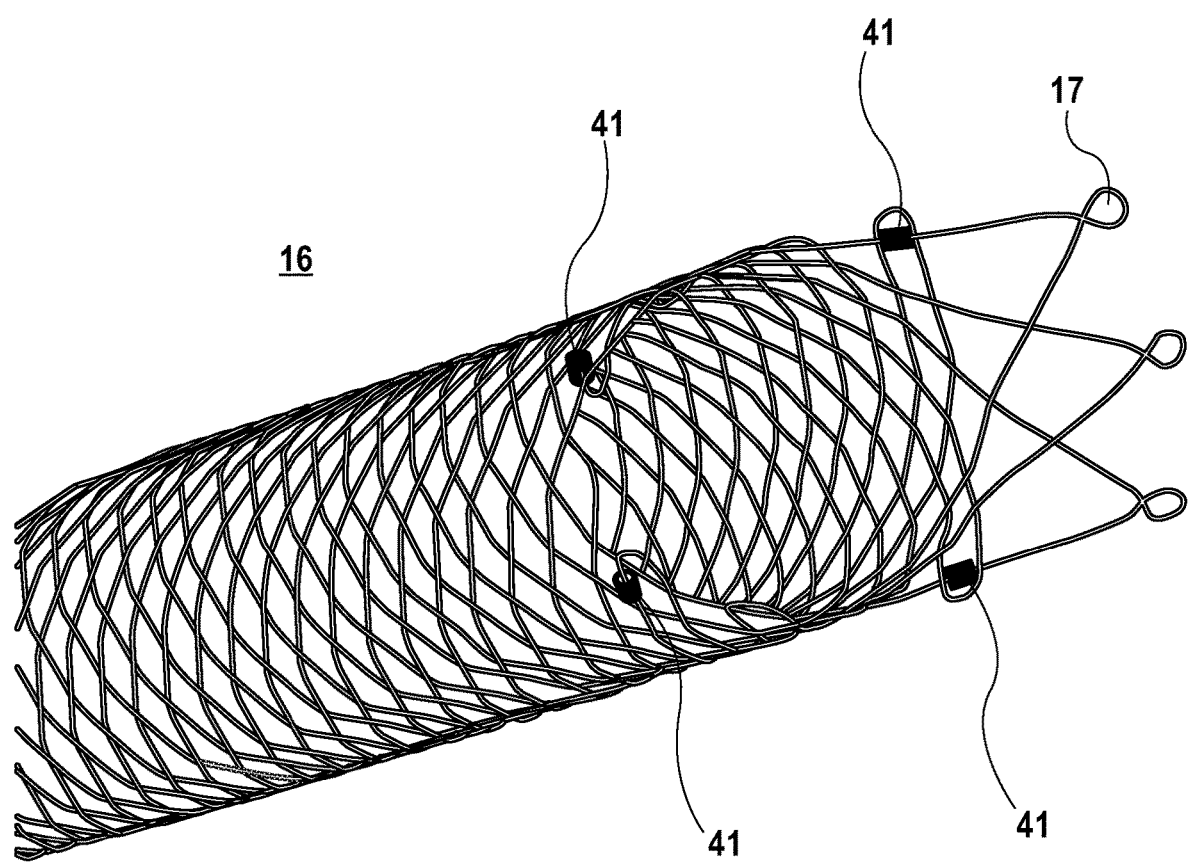

The shovel configuration of funnel-like sleeve 16 is shown in greater detail in FIGS. 2D-E.

In the embodiments shown in these Figures, funnel-like sleeve 16 is braided (and optionally covered) and includes distal end wire loops 17 that form leaflets that extend distally to lengthen distal end 31 by 1-3 mm around 25%-75% of the circumference of funnel-like sleeve 16. The resulting distal end 31 is beveled at an angle (B) that can be 30-80 degrees.

Wire loops 17 can also be angled (A) outward (splayed out, FIG. 2D) at 120-170 degrees (around most or all of the circumference) such that distal end 31 of the funnel-like sleeve 16 defining opening 34 has a diameter larger than that of the lumen of funnel-like sleeve 16 (15-60% larger). This enhances the ability of distal end 31 leaflets to engulf the thrombus and creates a seal between distal end 31 of funnel-like sleeve 16 and the vessel wall. This results in a higher aspiration force, smoother clot entrance into funnel-like sleeve 16 and reduces the chance of artery and funnel-like sleeve collapse.

FIGS. 4A-C and 5A-C illustrate the stepwise capture of a thrombus 30 lodged in a blood vessel 32.

Figures 4A, 4B, 4C:
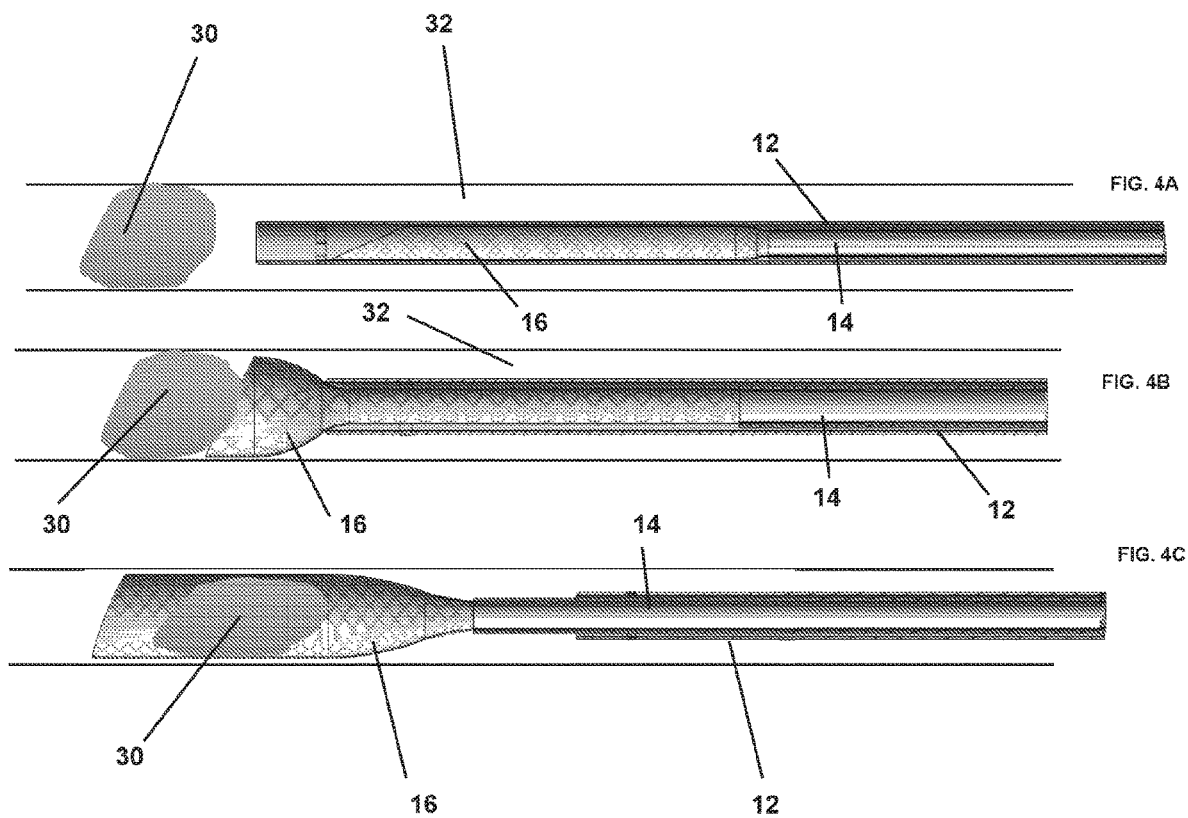
FIGS. 4A-C illustrate clot capture using a shovel-funnel catheter configuration.

In a first step (FIGS. 4A, 5A), system 10 is positioned at a distance from, or adjacent to, the thrombus 30 using standard over the wire, percutaneous access, techniques (with the wire positioned through inner tube 14). Funnel-like sleeve 16 is then partially deployed using trigger 26 or markings 20 and distal opening 34 of Funnel-like sleeve 16 is advanced and positioned against thrombus 30 (FIGS. 4B, 5B). Suction is then applied through inner tube 14 to partially internalize/engage thrombus 30. Slow and small volume of blood is drawn in the syringe, indicating thrombus engagement.

Funnel-like sleeve 16 is then extended out while maintaining suction to thereby completely internalize thrombus 30. Once completely internalized, distal opening 34 of funnel-like sleeve 16 is closed (e.g., with a pull wire). System 10 can then be retrieved along with thrombus 30 out of the body.

Figure 4D:
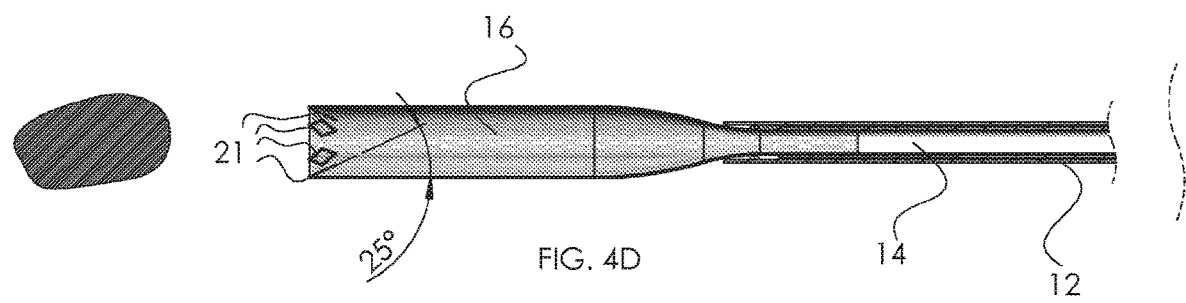
FIGS. 4D-F illustrate clot capture using a shovel-funnel catheter configuration having flexible arms.
Figure 4E:
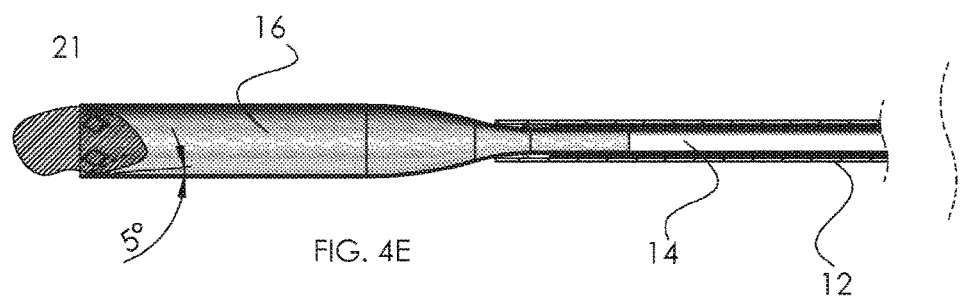
Figure 4F:
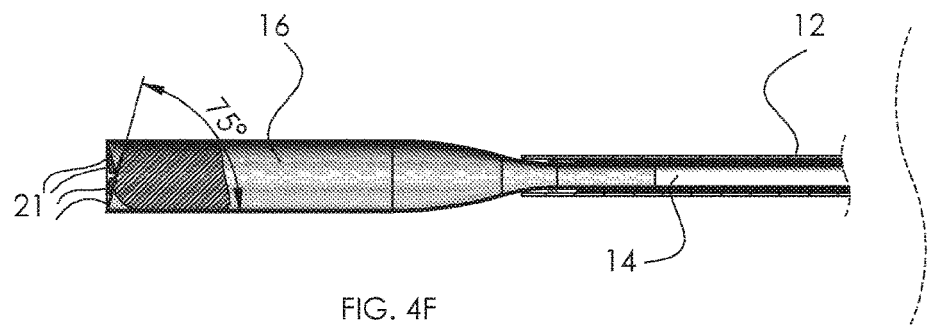

FIGS. 4D-F illustrate capture using a standard funnel-like sleeve 16 having a capture/closure mechanism that includes flexible arms 21 at a distal portion of funnel-like sleeve 16. Arms 21 are attached to the braid material of funnel-like sleeve 16 (or are formed therewith) and project distally at an angle of 16-25° degrees away from a centerline of funnel-like sleeve 16. When material (thrombus) advances towards the opening of funnel-like sleeve 16 (FIG. 4D), it pushes arms 21 outward (FIG. 4E) thus allowing the material to move into funnel-like sleeve 16. In that respect, arms 21 function as a flexible trap door. Once the material is within the proximal portion of funnel-like sleeve, any movement towards the distal end pushes arms 21 to effectively block the distal opening and prevent material release (FIG. 4F).

Funnel-like sleeve 16 and outer tube 12 and/or inner tube 14 can include radiopaque markers 41 (FIG. 2F) to indicate funnel opening under fluoroscopy, and the distance of distal end 31 from the thrombus or occlusion site. Radiopaque markers 41 can be, for example, 3-6 gold dots that are positioned on the braid wires near or at distal end 31 around the circumference. The distance between imaged radiopaque markers can be used to indicate the extent of opening of funnel-like sleeve 16 in the vessel.

Funnel-like sleeve 16 can also include sensors or sensor arrays 43 (at proximal and distal ends) for detecting the presence of material within the lumen. Sensors 43 can be impedance sensors such as those described in US20190159684.

Base (proximal) sensor 43 can be used to determine when suction can be halted as material reaches the tapered base portion of funnel-like sleeve 16. Tip (distal) sensors 43 can be used to determine if material is at the opening of funnel-like sleeve 16 and possibly interfering with closure.

Figure 9B:
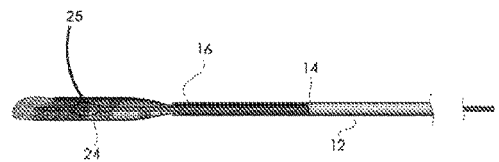
FIGS. 9A-9B illustrate an embodiment of the present catheter system that includes a macerator within the funnel.
Figure 9A:
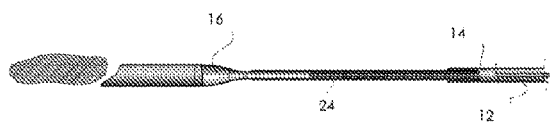

System 10 can also include a macerator 24 (FIGS. 9A-B) for macerating trapped thrombi. Macerator 24 can be introduced into funnel-like sleeve 16 through inner tube 14 (FIG. 9A) and can include a deployable cutter 25 that can include a 1 or more arcuate blades that when rotated macerate the thrombus material and allow subsequent collection thereof through inner tube 14.

As used herein the term "about" refers to ±10%.

Additional objects, advantages, and novel features of the present invention will become apparent to one ordinarily skilled in the art upon examination of the following examples, which are not intended to be limiting.

EXAMPLES

Reference is now made to the following example, which together with the above descriptions, illustrate the invention in a non-limiting fashion.

Animal Trials

Figure 7A:
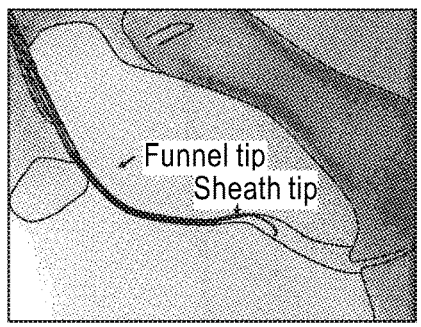
FIGS. 7A-C are fluorographic images of clot capture in a pig model using the present catheter system fitted with a standard funnel.

A trial was conducted on a 60 Kg female pig using a prototype of the present system having a standard or shovel funnel. The clot was produced from pig autologous blood to create a whole blood thrombus, the thrombus was injected to the target site using a 6 Fr sheath and an angiogram was performed to verify vessel occlusion. A femoral access site was used to navigate the system over-the-wire and microcatheter to the occluded site in the vessel with the funnel collapsed within the catheter sheath (outer tube). The funnel tip with radiopaque markers and a marker band on the outer catheter tip were visible under fluoroscopy (FIG. 7A) during navigation.

Figure 7B:
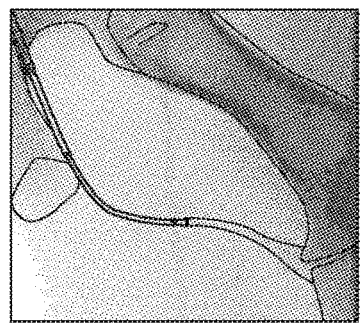
Figure 7C:
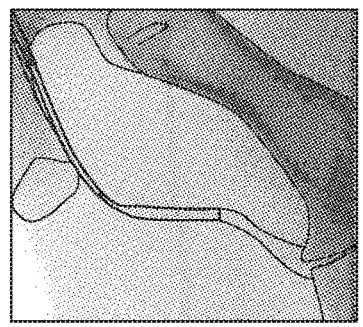

The catheter distal end was positioned a few millimeters from the clot and the microcatheter and guide wire were removed. The funnel was advanced to the distal edge of the outer tube and the outer tube was pulled back 2-3 mm partially deploying the funnel to form a cone (FIG. 7B). Suction was applied and the outer tube was pulled while the inner tube attached to the funnel was pushed forward to fully deploy the funnel (FIG. 7C). The distal opening of the funnel was closed using a pull wire and retracted into the outer tube. The system was then removed along with the clot trapped within the funnel.

A second trial was conducted on a 60 Kg female pig using a prototype of the present system having a shovel-like funnel. A femoral access site was used to navigate the system over-the-wire and microcatheter to the occluded site in the vessel with the funnel collapsed within the catheter sheath (outer tube).

Figure 8A:
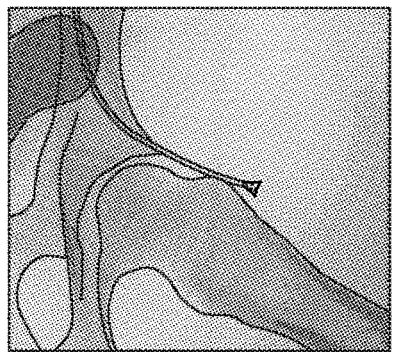
FIGS. 8A-B are fluorographic images of clot capture in a pig model using the present catheter system fitted with a shovel funnel.
Figure 8B:
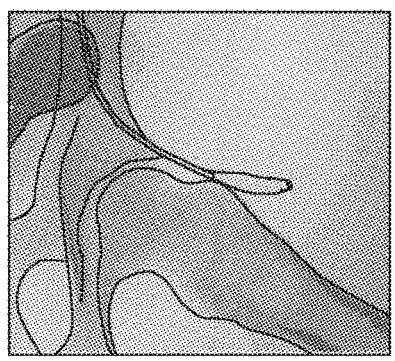
Figure 8C:
FIG. 8C is an image of the clot material retrieved by the procedure shown in FIGS. 8A-B.

The catheter distal end was positioned a few millimeters from the clot (indicated by the contrast border of the angiograph) and the microcatheter and guide wire were removed (FIG. 8A). The funnel was advanced to the distal edge of the outer tube and the outer tube was pulled back 2-3 mm partially deploying the funnel to form a cone (FIG. 8B). Suction was applied and the outer tube was pulled while the inner tube attached to the funnel was pushed forward to fully deploy the funnel (FIG. 8C). The distal opening of the funnel was closed using a pull wire and retracted into the outer tube. The system was then removed along with the clot trapped within the funnel.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A method of retrieving biological material from a blood vessel comprising:
   advancing a distal part of a catheter system into the blood vessel while the catheter system is in a preconfigured delivery state in which a funnel-shaped sleeve of the catheter system is compressed within a catheter of the catheter system, the catheter system being preconfigured to have:
   a partially-deployed state in which (i) a predetermined distal part of the funnel-shaped sleeve is disposed out of a distal opening of the catheter, and (ii) a predetermined intermediate part of the funnel-shaped sleeve and a predetermined proximal part of the funnel-shaped sleeve are disposed within the catheter,
   a fully-deployed state in which (i) the distal part and the intermediate part are disposed out of the distal opening, and (ii) the proximal part is disposed within the catheter;
   while the distal part of the catheter system remains in the blood vessel, transitioning the catheter system into the partially-deployed state by advancing the distal part of the funnel-shaped sleeve out of the distal opening;

while the catheter system remains in the partially-deployed state, applying suction to trap at least part of the biological material within the funnel-shaped sleeve; and subsequently, transitioning the catheter system into the fully-deployed state by advancing the intermediate part out of the distal opening; and while the catheter system remains in the fully-deployed state, applying further suction to draw more of the material into the funnel-shaped sleeve.

2. The method according to claim 1, wherein transitioning the catheter system into the fully-deployed state comprises transitioning the catheter system into the fully-deployed state by advancing the intermediate part out of the distal opening while applying suction via the catheter system.

3. The method according to claim 1, wherein the predetermined distal part has a predetermined length, and wherein advancing the predetermined distal part of the funnel-shaped sleeve out of the distal opening comprises advancing the funnel-shaped sleeve out of the distal opening until the length of the funnel-shape sleeve within the blood vessel is the predetermined length.

4. The method according to claim 3, wherein the predetermined length is 2-8 mm.

5. The method according to claim 1, wherein:
the distal part is biased to assume a conical shape, and
transitioning the catheter system into the partially-deployed state by advancing the distal part of the funnel-shaped sleeve out of the distal opening comprises transitioning the catheter system into the partially-deployed state by advancing the distal part of the funnel-shaped sleeve out of the distal opening such that the distal part assumes the conical shape within the blood vessel.

6. The method according to claim 5, wherein:
the intermediate part is biased to assume a cylindrical shape, and
transitioning the catheter system into the fully-deployed state by advancing the intermediate part out of the distal opening comprises transitioning the catheter system into the fully-deployed state by advancing the intermediate part out of the distal opening such that, within the blood vessel, the intermediate part assumes the cylindrical shape while the distal part remains in the conical shape.

7. The method according to claim 1, wherein the catheter system includes markings, and wherein transitioning the catheter system into the partially-deployed state comprises transitioning the catheter system into the partially-deployed state guided by the markings.

8. The method according to claim 7, wherein:
the funnel-shaped sleeve includes radiopaque markers,
a distal tip of the catheter includes a radiopaque marker, and
transitioning the catheter system into the partially-deployed state comprises transitioning the catheter system into the partially-deployed state guided by the radiopaque markers.

9. The method according to claim 1, wherein the proximal part of the funnel-shaped sleeve is attached to an inner shaft, the inner shaft extending, from the proximal part, proximally through the catheter to a handle of the catheter system, and wherein transitioning the catheter system into the partially-deployed state and the fully-deployed state comprises using the handle to move the inner shaft distally with respect to the catheter.

10. The method according to claim 9, wherein the handle is actuatable to lock a position of the funnel-shaped sleeve with respect to the catheter.

11. The method according to claim 9, wherein transitioning the catheter system into the partially-deployed state comprises actuating a mechanism on the handle to apply a preconfigured amount of force to the catheter system to move the funnel-shaped sleeve with respect to the catheter in a manner that (i) advances the distal part out of the catheter and (ii) retains the intermediate part within the catheter.

12. The method according to claim 9, wherein:
the handle includes a mechanism that is switchable between a first discrete-state and a second discrete-state,
switching the mechanism between the first discrete-state and the second discrete-state transitions the catheter system from the preconfigured delivery state to the partially-deployed state,
advancing the distal part of the catheter system into the blood vessel while the catheter system is in the preconfigured delivery state comprises advancing the distal part of the catheter system into the blood vessel while the mechanism is in the first discrete-state, and
transitioning the catheter system into the partially-deployed state comprises switching the mechanism on the handle to the second discrete-state.

13. The method according to claim 12, wherein:
the mechanism is further switchable between the second discrete-state and a third discrete-state,
switching the mechanism between the second discrete-state and the third discrete-state transitions the catheter system from the partially-deployed state to the fully-deployed state, and
transitioning the catheter system into the fully-deployed state comprises switching the mechanism on the handle to the third discrete-state.

14. The method according to claim 12, wherein the mechanism defines a scale, each of the discrete-states being discrete positions on the scale, and wherein switching the mechanism to the second discrete-state comprises moving the mechanism between the discrete-states on the scale.

15. The method according to claim 12, wherein the mechanism is a slider, and wherein switching the mechanism to the second discrete-state comprises sliding the slider along a track.

16. The method according to claim 15, wherein the second discrete-state is facilitated by an indent that is adapted to inhibit sliding of the slider, and wherein switching the mechanism from the first discrete-state to the second discrete-state comprises sliding the slider along the track until the slider is inhibited from sliding distally by the indent.

17. The method according to claim 15, wherein the slider is coupled to the inner shaft, and wherein transitioning the catheter system into the partially-deployed state by advancing the distal part of the funnel-shaped sleeve out of the distal opening comprises sliding the slider distally along the track such that the inner shaft slides distally within the catheter in a manner that advances the distal part out of the distal opening.

18. A method of retrieving biological material from a blood vessel comprising:
advancing a distal part of a catheter system into the blood vessel while the catheter system is in a preconfigured delivery state in which a funnel-shaped sleeve of the catheter system is compressed within a catheter of the catheter system;

while the distal part of the catheter system remains in the blood vessel, transitioning the catheter system into a preconfigured partially-deployed state by advancing a predetermined distal part of the funnel-shaped sleeve out of a distal opening of the catheter, such that an intermediate part of the funnel-shaped sleeve and a proximal part of the funnel-shaped sleeve remain within the catheter;

while the catheter system remains in the partially-deployed state, applying suction to trap at least part of the biological material within the funnel-shaped sleeve;

subsequently, transitioning the catheter system into a fully-deployed state by further advancing the funnel-shaped sleeve out the catheter such that the intermediate part extends out of the distal opening and the proximal part of the funnel-shaped sleeve remains within the catheter; and while the catheter system remains in the fully-deployed state, applying further suction to draw more of the material into the funnel-shaped sleeve.

19. The method according to claim 18, wherein:

the proximal part of the funnel-shaped sleeve is attached to an inner shaft that has a handle, the inner shaft extending, from the proximal part, proximally through the catheter to the handle, the handle is actuatable to lock the funnel-shaped sleeve with respect to the catheter, and transitioning the catheter system into the partially-deployed state and the fully-deployed state comprises using the handle to move the inner shaft distally with respect to the catheter.

* * * * *